United States Patent Office
3,469,957
Patented Sept. 30, 1969

3,469,957
PROCESS FOR THE PRODUCTION OF
COMBUSTIBLE GASES
George Percival and Thomas Rowland Phillips, Solihull, England, assignors to The Gas Council, London, England, a British body corporate
No Drawing. Filed Jan. 12, 1965, Ser. No. 425,052
Claims priority, application Great Britain, Jan. 17, 1964, 2,229/64
Int. Cl. C10k 3/06
U.S. Cl. 48—214           9 Claims

ABSTRACT OF THE DISCLOSURE

A low temperature steam-reforming process for the production of methane-containing gases wherein a paraffinic hydrocarbon feedstock, containing an average of 2 to 5 carbon atoms per molecule is mixed with steam. The mixture at atmospheric or superatmospheric pressure, is passed through a bed of a steam-reforming catalyst at a bed temperature below 400° C.

---

The invention relates to a process for the production of combustible gases.

In our British patent specification No. 820,257 there are described and claimed processes for the production of gases containing methane from mixtures of predominantly paraffinic hydrocarbons wherein the vapour of the hydrocarbons and steam are passed through a bed of a nickel catalyst under atmospheric or superatmospheric pressure, and the hydrocarbon vapour and steam are passed into the catalyst bed at a temperature above 350° C. such that the bed is maintained by the reaction at a temperature within the range 400° C. to 550° C.

The pressures employed may be up to 50 atmospheres but may be higher if desired. Convenient pressures are within the range 10 to 25 atmospheres.

In conjunction with the proportions of steam to distillate which are described in our prior specification, the upper limit of the temperature, 550° C., was specified to avoid carbon deposition on the catalyst and the lower limit, 400° C., was specified to minimise the tendency for loss of activity of the catalyst, which becomes more marked the higher the average molecular weight of the hydrocarbon used.

The specification also describes a process in which the gases produced when the mixture of steam and hydrocarbons is passed through a bed of nickel catalyst at a temperature of 400°–550° C. are subsequently subjected to the action of a nickel catalyst at a temperature below 400° C. to bring about the formation of methane by reaction between the carbon monoxide and hydrogen present in the gas.

It has now been surprisingly found that, when very light hydrocarbons containing an average of from 2 to 5 carbon atoms per molecule are used, the reaction with steam may be carried out at a lower temperature, for example, within the range of 250° to 400° C.

The present invention provides a process for the production of gases containing methane from predominantly paraffinic hydrocarbons, or mixtures thereof, containing an average of from 2 to 5 carbon atoms per molecule, which process comprises passing a mixture of the hydrocarbons and steam through a bed of catalyst under atmospheric or superatomospheric pressure, the temperature of the bed of catalyst being below 400° or below 390° C., whereby reaction of the hydrocarbons and steam is effected to produce a methane-containing gas. The temperature of the bed of catalyst may be between 250° C. and 390° C. or 400° C.

The use of these lower temperatures is possible, so we have found, because the activity of the catalyst is not materially affected by the use of such light hydrocarbons. The proportion of steam required relative to the hydrocarbons is greater than that which enters into reaction and the excess steam required for this purpose depends on the average molecular weight of the hydrocarbons used and increases with increase in molecular weight. The excess is not great and 1.3 parts of steam to one part by weight of hydrocarbon may be used with all mixtures of hydrocarbons containing an average of 2 to 5 carbon atoms per molecule. In the case of hydrocarbon mixtures containing an average of 2 to 4 carbon atoms per molecule the proportion of steam may be as low as 1.0 part by weight.

The catalyst bed may be provided with means for removing heat liberated during the reaction so that the temperature of the catalyst bed remains within the required range. The removal of the heat of reaction may be effected by the provision of tubes in all or part of the catalyst bed through which tubes suitable fluid is passed in such a way that sufficient heat is transferred from reacting gases and catalyst particles to the flowing fluid so that the temperature of the catalyst bed is maintained at the required value. Heat may be recovered from the fluid so heated, or where the fluid is the incoming mixture of steam and hydrocarbon vapour the heat transferred is utilised in preheating the mixture to the required level.

It may be necessary to restrict and control the temperatures which are developed by reactions occurring locally within the catalyst bed. These temperatures can be controlled by the recirculation of a proportion of the product gas and mixing it with the hydrocarbon vapour and steam to be reacted prior to passage of the mixture through the bed of catalyst such that the regions of high temperature are controlled and restricted to the required range.

The catalyst used must be capable of bringing about the formation of methane by the decomposition of hydrocarbons and steam so that the resulting mixture of methane, hydrogen, carbon monoxide, carbon dioxide and steam closely approaches the composition determined by the equilibrium constants of the following reactions within the stated range of temperature:

$$CO + 3H_2 \rightleftharpoons CH_4 + H_2O$$
$$CO + H_2O \rightleftharpoons CO_2 + H_2$$

The resultant gases will then contain, for example, more than 90 percent by volume of methane after the removal of carbon dioxide and water vapour. The process described is therefore a means of manufacturing a gas that is interchangeable with natural gas in that it has a similar calorific value and similar combustion characteristics to natural gas.

Following is a description by way of example of methods of carrying the present invention into effect.

Example 1

A predominantly paraffinic hydrocarbon, commercial butane, containing 3.89 atoms of carbon per molecule was freed from sulphur compounds and mixed with steam in the proportion of 1.19 parts by weight of steam to 1 part by weight of hydrocarbon. The mixture was preheated to 350° C. and under a pressure of 24.6 atmospheres was passed downwardly through a bed of nickel-alumina catalyst 2 feet deep at a space velocity of 8,000 vols. dry product gas/vol. catalyst/hr. The heat of reaction was removed from the catalyst bed by air cooling so that the lower 12 ins. of the bed was maintained at 300° C. The recirculation of product gas was not required for the control of the reaction temperature in the small diameter tube that was used for the experiment. The composition of the product gas was:

| Gas leaving reaction tube: | | Dried and $CO_2$ removed to 1% |
|---|---|---|
| $CO_2$, 11.1 | | 1.0 |
| CO, 0.2 | | 0.35 |
| $H_2$, 0.85 | | 1.65 |
| $CH_4$, 49.25 | | 97.0 |
| $H_2O$, 38.6 | | --- |

Calorific value, 970 B.t.u./cu. ft.

The general procedure of this example may be carried out also in a similar manner with propane.

Example 2

A predominantly paraffinic hydrocarbon, consisting substantially of pentane, containing an average of 5.0 atoms of carbon per molecule, was freed from sulphur compounds and mixed with steam in the proportion of 1.3 parts by weight of steam to 1 part by weight of hydrocarbon. The mixture was preheated to 350° C. and, under a pressure of 25 atmospheres, was passed downwardly through a bed of nickel-alumina catalyst 2 feet deep at a space velocity of 8,000 vols. dry product gas/vol. catalyst/hr. The heat of reaction was removed from the catalyst bed by air cooling so that the lower 12 ins. of the bed was maintained at 350° C. The recirculation of product gas was not required for the control of the reaction temperature in the small diameter tube that was used for the experiment. The composition of the product gas was:

| Gas leaving reaction tube: | | Dried and $CO_2$ removed to 1% |
|---|---|---|
| $CO_2$, 11.85 | | 1.0 |
| CO, 0.25 | | 0.5 |
| $H_2$, 3.0 | | 6.05 |
| $CH_4$, 45.8 | | 92.45 |
| $H_2O$, 39.1 | | ---- |

Calorific value, 940 B.t.u./cu. ft.

The catalyst employed in both examples was catalyst E of Example I of our British patent specification No. 969,637; this specification describes the catalyst which is a nickel-alumina catalyst which has been prepared by the co-precipitation of nickel and aluminium compounds from aqueous solution followed by reduction of the nickel compounds in the mixture to metallic nickel, and which contains an addition of an oxide, hydroxide or carbonate of an alkali metal or alkaline earth metal.

We claim:

1. A process for the production of combustion gases containing more than 90% by volume of methane from predominantly paraffinic hydrocarbons and mixtures thereof, containing an average of from two to five carbon atoms per molecule, which process comprises the steps of passing a mixture of said hydrocarbons and steam through a bed of a catalyst at a pressure of at least atmospheric pressure, the temperature of the bed of catalyst being below 400° C., whereby reaction of the hydrocarbons and steam is effected to produce a gas containing methane, hydrogen, steam and carbon oxides and removing the steam and carbon dioxide to produce said combustion gas.

2. A process as claimed in claim 1 wherein the temperature of the bed of catalyst is between 250° C. and 390° C.

3. A process as claimed in claim 1 wherein the proportion of steam in the mixture is about 1.3 parts of steam to 1 part by weight of the hydrocarbons.

4. A process as claimed in claim 1 wherein the temperature of the catalyst bed is controlled by the recirculation of a proportion of the product methane-containing gas by mixing the product gas with the hydrocarbon vapour and steam to be reacted prior to passage of the mixture through the bed of catalyst.

5. A process as claimed in claim 1 wherein the temperature of the catalyst bed is controlled by the passage of a fluid through tubes positioned in the catalyst bed.

6. A process as claimed in claim 1, wherein the catalyst is a nickel-containing catalyst.

7. A process as claimed in claim 6, wherein the catalyst is reduced nickel supported on alumina.

8. A process as claimed in claim 7, wherein the catalyst is a nickel-alumina catalyst which has been prepared by the co-precipitation of nickel and aluminium compounds from aqueous solution followed by reduction of the nickel compounds in the mixture to metallic nickel, and which contains an addition of a compound selected from the gorup consisting of oxides, hydroxides or carbonates of alkali metals and alkaline earth metals.

9. A process as claimed in claim 1, wherein the paraffinic hydrocarbons contain an average of from 2 to 4 carbon atoms per molecule and are substantially wholly in the gas phase at normal atmospheric pressure and temperature and the proportion of steam in the mixture is 1 part of steam to 1 part of weight of hydrocarbons.

References Cited

UNITED STATES PATENTS

| 3,271,325 | 9/1966 | Davies et al. | 48—214 XR |
| 3,334,055 | 8/1967 | Dowden et al. | 48—214 XR |

FOREIGN PATENTS

| 820,257 | 9/1959 | Great Britain. |
| 969,637 | 9/1964 | Great Britain. |
| 994,278 | 6/1965 | Great Britain. |

MORRIS O. WOLK, Primary Examiner

R. E. SERWIN, Assistant Examiner

U.S. Cl. X.R.

48—197; 252—466